(12) United States Patent
Leung et al.

(10) Patent No.: US 8,175,262 B1
(45) Date of Patent: May 8, 2012

(54) PER TONE COPROCESSOR ARCHITECTURE

(75) Inventors: Pak Hei Matthew Leung, Shatin (HK); Raphael Jean Cendrillon, Kennedy (HK)

(73) Assignee: Marvell International Ltd., Hamilton (BM)

( * ) Notice: Subject to any disclaimer, the term of this patent is extended or adjusted under 35 U.S.C. 154(b) by 1209 days.

(21) Appl. No.: 11/940,802

(22) Filed: Nov. 15, 2007

Related U.S. Application Data

(60) Provisional application No. 60/865,950, filed on Nov. 15, 2006.

(51) Int. Cl.
*H04M 9/00* (2006.01)
*H04M 1/76* (2006.01)
*H04M 7/00* (2006.01)

(52) U.S. Cl. ........................................................ 379/417

(58) Field of Classification Search ................... 379/417
See application file for complete search history.

(56) References Cited

U.S. PATENT DOCUMENTS 5,887,032 A * 3/1999 Cioffi ............................. 375/257
7,002,897 B2 * 2/2006 Jones et al. .................... 370/201

* cited by examiner

*Primary Examiner* — Alexander Jamal

(57) ABSTRACT

A system for processing subscriber line data signals uses a coprocessor to receive signals in a pre-determined order from a plurality of line interface cards. The coprocessor uses the pre-determined order to sort the data signals by tone and process all received signals on the same tone at the same time. Because all signals on a tone, or those on a tone with known crosstalk issues, are processed together, the signal improvement is better than prior art methods. When not used, the coprocessor may be replaced with a loop-back circuit to reduce cost when crosstalk is not a significant issue.

36 Claims, 16 Drawing Sheets

PER TONE COPROCESSOR ARCHITECTURE

CROSS-REFERENCE TO RELATED APPLICATION

The present application claims the benefit of U.S. Provisional Application No. 60/865,950, entitled "Per Tone Coprocessor Architecture," filed on Nov. 15, 2006, which is hereby incorporated by reference herein.

The present application also is related to commonly owned U.S. patent application Ser. No. 11/940,805, entitled "CROSSTALK CANCELLER INITIALIZATION," filed on the same day as the present application, and which is hereby incorporated by reference herein in its entirety.

DESCRIPTION OF RELATED ART

In a communication system with physical media, two signals transmitted in proximity may interfere with each other. This is particularly likely when the signals are transmitted via twisted pair lines in a bundle with other twisted pair lines because the close proximity over long spans allows a transformer effect to take place between proximate lines. In voice telephone applications, the crosstalk effect is minimal because of the low baseband frequencies involved. However, in digital subscriber line (DSL) applications, the data signals are transposed via a carrier, or tone, to a higher frequency and are more subject to crosstalk effect. This is especially true when proximate signals use the same tone or sub-carrier.

Crosstalk that results from nearby lines providing inbound data from, for example, a subscriber premise is known as far end crosstalk (FEXT). An additional source of crosstalk is when downstream data on a full duplex line affects the upstream data on the same pair. This is called near-end crosstalk (NEXT). FEXT and NEXT may be reduced using statistical methods after identification of susceptible lines. Crosstalk cancellation, especially for DSL lines, typically takes place at a central office line card used to terminate individual lines.

SUMMARY OF THE DISCLOSURE

Because conventional crosstalk cancellation takes place at the line card, only those signals received or transmitted by that line card can be used for talk cancellation processing. A system for crosstalk and cancellation signal processing is provided that combines tones from more than one line interface, allowing processing of a much larger selection of signals. Signals using the same tone may be selected from any of a number of line interfaces and directed to a coprocessor for processing. The coprocessor may include an array of signal processors and a programmable switch matrix. By using the array of signal processors and the programmable switch matrix, the coprocessor architecture may be scaled or expanded to process virtually any number of a signal lines. The configuration of line interfaces and the coprocessor is well suited for crosstalk cancellation, but may be used for any signal processing, such as line filtering and pre-coding.

Each line interface may incorporate a master or a slave controller that allows buffered signals to be read out to the coprocessor, where each signal is switched to the signal processor handling a particular tone. Data from the master controller may be provided to the coprocessor to coordinate the sending and switching processes.

The line interfaces may send outbound data to the coprocessor for signal conditioning before being sent to an analog front end (AFE) for delivery to a destination. Outbound data may also be buffered in the coprocessor and used for near-end crosstalk cancellation.

In one embodiment of the architecture, the coprocessor may be separate from the line interfaces. Separating the coprocessor from the line interface may permit a more simple architecture for providing access to a number of line interfaces. It also allows the coprocessor to be eliminated using a simple loop-back circuit or jumpers when the coprocessor either adds too much cost or signal processing does not significantly improve signal quality, i.e. transmission speed.

The use of the coprocessor may also lower the overall computational resource requirement. When crosstalk cancellation is placed in each individual line interface, crosstalk cancellation circuitry must be sized for a worst case environment. However, in practice, only a few lines from each bundle will experience the most severe crosstalk interference, while the majority of lines may require little or no crosstalk interference processing. By centralizing crosstalk cancellation, an appropriate processor may be used in keeping with an average processing requirement, rather than the worst case processing requirement needed for a series of distributed crosstalk cancellation nodes. Test algorithms using known data patterns may help determine individual crosstalk patterns and the amount of processing power to dedicate to each tone.

DETAILED DESCRIPTION

Figure 1:
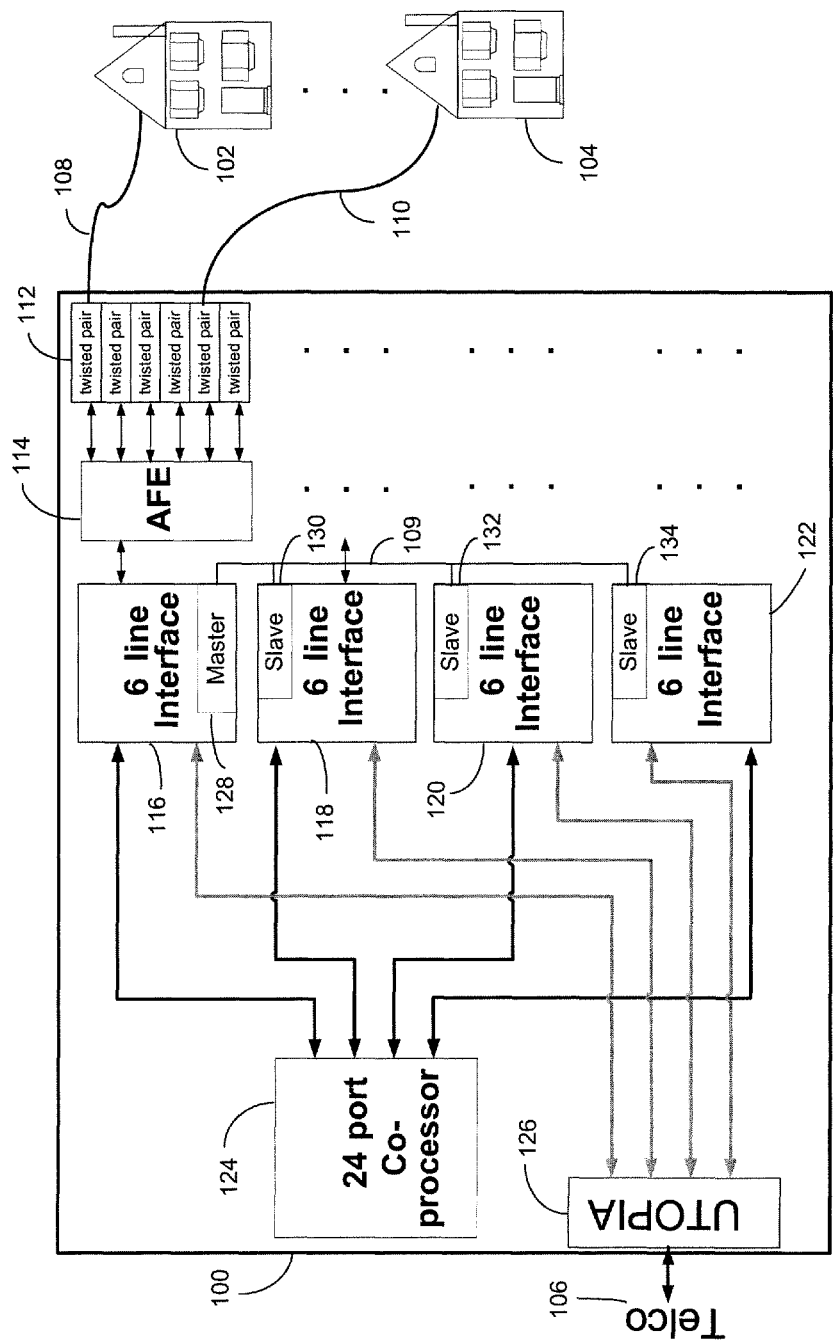
FIG. 1 is a block diagram of data network.

FIG. 1 is a block diagram of a data network including an embodiment of a central office interface 100 (CO interface) that connects representative subscribers 102, 104 to a service provider backbone (telco) 106. Line connections 108 and 110 may be brought into the CO interface 100 in a twisted pair bundle 112 for example and from there to an analog front end 114. The analog front end 114 may provide signal conditioning. A number of line interface modules 116, 118, 120, 122 are coupled to the analog front end 114. In some embodiments, there may be a separate analog front end 114 for each line interface. In the example of FIG. 1, the analog front end 114 supports six subscriber lines and is coupled to line interface 116, that supports those six subscriber lines. More or less than six lines may be supported in other embodiments. The line interface may be a digital subscriber line (DSL) line interface, for example, supporting both voice and data.

In practice, twisted pair bundle 112 may be cables of 50 pairs of lines or more. The subscriber line connections 108, 110 may be in close contact with each other, or any one of the other subscriber lines (not depicted), for a considerable distance before reaching its respective line interfaces 116, 188, 120, 122 card. Any of these lines are susceptible to crosstalk but particularly those that are on the same carrier or tone.

Each of the line interfaces 116, 118, 120, 122 is shown coupled to both a coprocessor 124 and to a backbone interface 126 coupled to a service provider backbone 106. In this embodiment, the backbone interface 126 is a Utopia standard interface, commonly used in central office applications, but other interfaces may be utilized. The coprocessor 124 is shown in FIG. 1 as supporting 24 lines, but in other embodiments, the coprocessor 124 may support more or fewer line interfaces and consequently, more or fewer subscriber lines 108, 110.

The coprocessor 124 is suited to any application that calls for real-time signal processing, such as enhanced equalization functions, but the exemplary application discussed in the remainder of this document will be crosstalk cancellation.

The coprocessor 124 may be capable of operating across a larger number of lines than a single line interface-based crosstalk cancellation implementation to eliminate the need for secondary signal buffering. Therefore to minimize the memory requirements in the coprocessor 124, each line interface 116, 118, 120, 122 may send data to the coprocessor 124 in a coordinated fashion. To accomplish the coordination, one line interface 116 may be designated a master and the other line interfaces 118, 120, 122 may be designated as slaves. A master controller 128 may send configuration and timing information to the slave controllers 130, 132, 134 in their respective line controllers 118, 120, 122. Signal transfer coordination is discussed in more detail below with respect to FIGS. 7, 8A and 8B.

Figure 2:
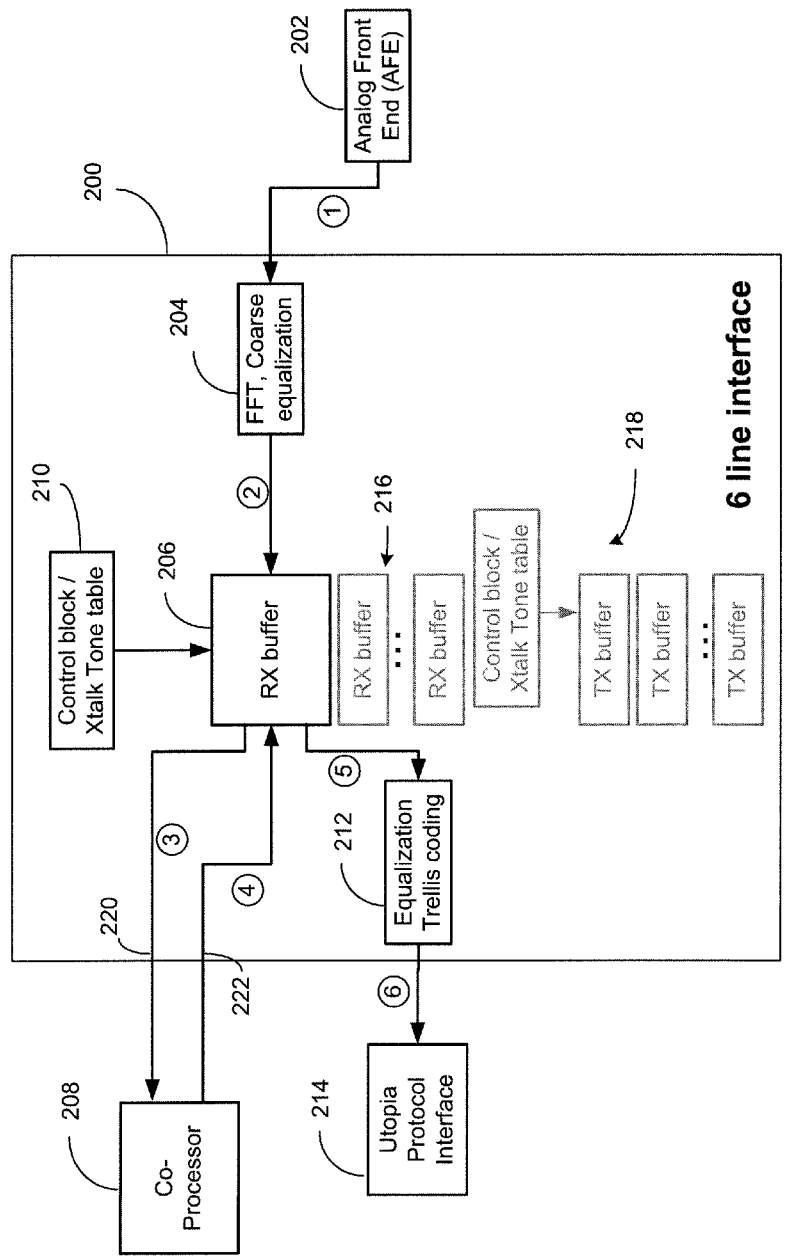
FIG. 2 is a block diagram of a line interface illustrating a receive data path.

FIG. 2 is a block diagram of an embodiment of a line interface 200 illustrating a receive data path. Circled numbers depict data flow order. The line interface 200 is coupled to an analog front end 202 which provides data to an input circuit 204. The input circuit 204 may include demodulation circuitry (not depicted), such as a fast Fourier transform demodulation function, as well as initial line equalization circuitry. The demodulation circuitry may convert the incoming signal from an analog form to a digital form. Data from the input circuit 204 may be stored in a receive buffer 206. Data from the receive buffer 206 may be sent to a coprocessor 208 for crosstalk cancellation, or other processing via a receive signal processor output 220, and returned to the receive buffer 206 after processing via a receive signal processor input 222. The order in which data is sent to the coprocessor is managed by a control block 210. The control block 210 may be either a master or slave controller and may include a crosstalk tone table which is discussed in more detail with respect to FIG. 7.

When the result data has been returned from the coprocessor 208 to the receive buffer 206, the result data may be forwarded to a receive output 212 that performs additional equalization and coding, for example trellis coding, and finally outputs data to a backbone network via an interface 214. In this exemplary embodiment, the interface 214 may be a Utopia protocol interface. Additional receive buffers 216 are illustrated in FIG. 2 to denote that the circuitry described may be duplicated for each line supported by the line interface 200. Transmit data processing is represented by additional circuitry 218 and is discussed in more detail with respect to FIGS. 4 and 5.

Figure 3:
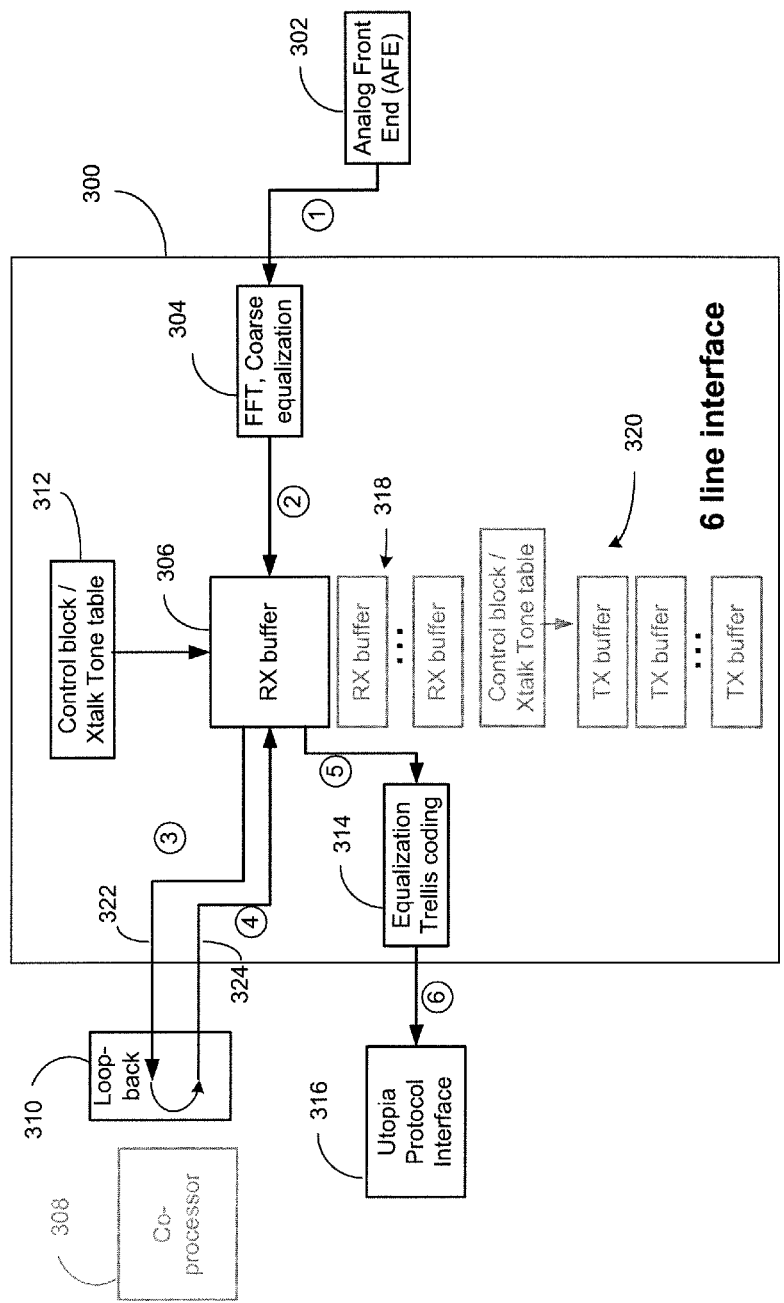
FIG. 3 is a block diagram of a line interface illustrating an alternate receive data path.

FIG. 3 is a block diagram of an embodiment of a line interface 300 illustrating an alternate receive data path. Circled numbers depict data flow order. The line interface 300 may be the same as line interface 200 of FIG. 2. As above, an analog front end 302 is coupled to an input circuit 304 and a receive buffer 306. A control block 312 manages a receive buffer 306 and the output circuit 314 provides data to backbone network 316 via Utopia protocol interface. In this embodiment, the coprocessor 308 is for example using either not present or not connected. In most embodiments, when the coprocessor 308 is not used it will not be present, representing a cost savings to the system. In its place, a loopback circuit 310 may simply take data from the receive buffer 306 via a receive signal processor output 322 and return it to the receive buffer 306 via the receive signal processor input 324 without any processing. Of course, this is not the only architecture possible. For example, the receive signal processor input 324 could go directly to the output circuit 314. One advantage of the architecture of FIG. 3 is that compared to a prior art line interface (not depicted) the only change to the line interface circuit data path is in the receive buffer 306. Other components such as the input and output circuits 304 and 314, and their respective connections, can remain unchanged.

Figure 4:
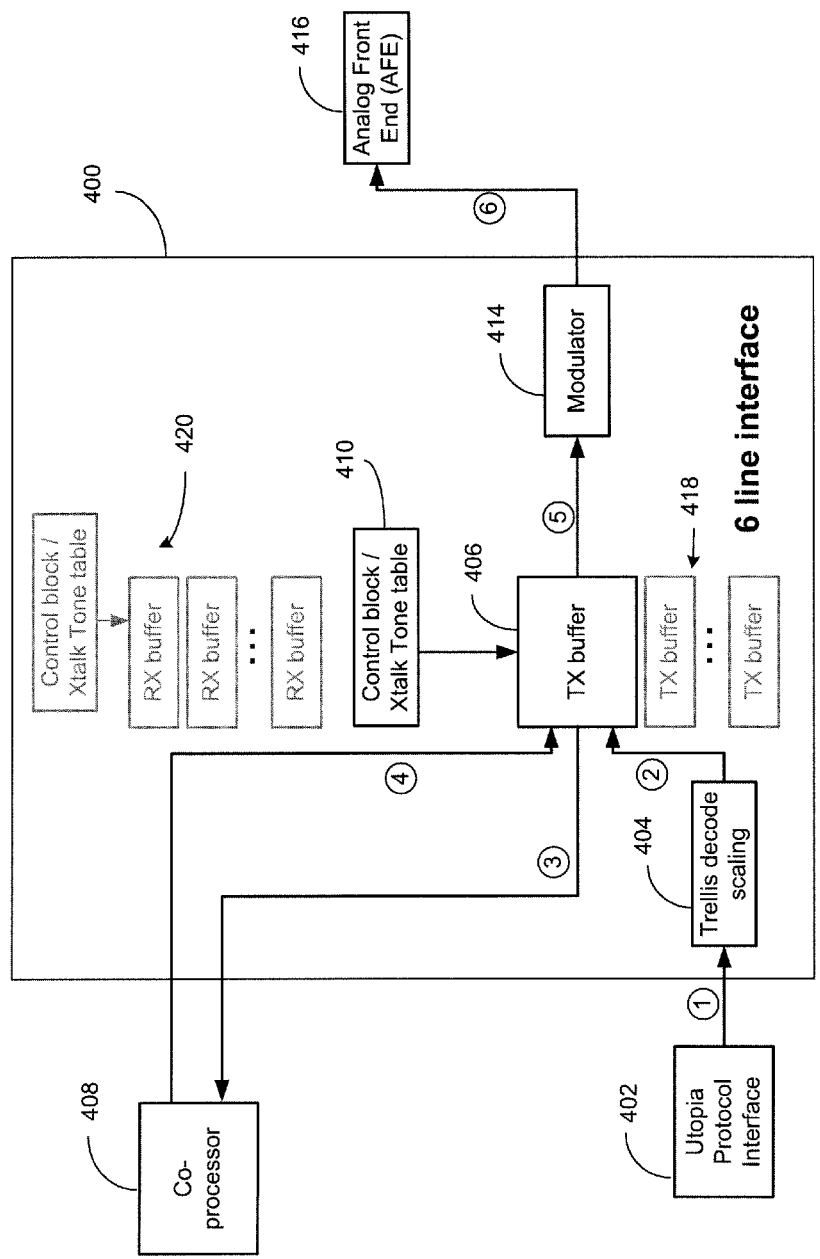
FIG. 4 is a block diagram of a line interface illustrating a transmit data path.

FIG. 4 is a block diagram of an embodiment of a line interface 400 illustrating a transmit data path. Circled numbers depict data flow order. Data may arrive at the line interface 400 via a Utopia protocol interface 402 for example or other data source. A transmit input circuit 404 may decode the incoming signal, for example using a trellis decoder, as well as to perform any necessary scaling. The resulting data may be stored in a transmit buffer 406 and from there be sent to a coprocessor 408. After any manipulation at the coprocessor 408, such as precoding, data may be returned to the transmit buffer 406. Sequencing and timing between the transmit buffer 406 and the coprocessor 408 may be managed by a control block 410. Data from the transmit buffer 406 may be sent to an output modulator 414, such as an inverse fast Fourier transform (IFFT) modulator, and from there sent to an analog front end 416.

Figure 5:
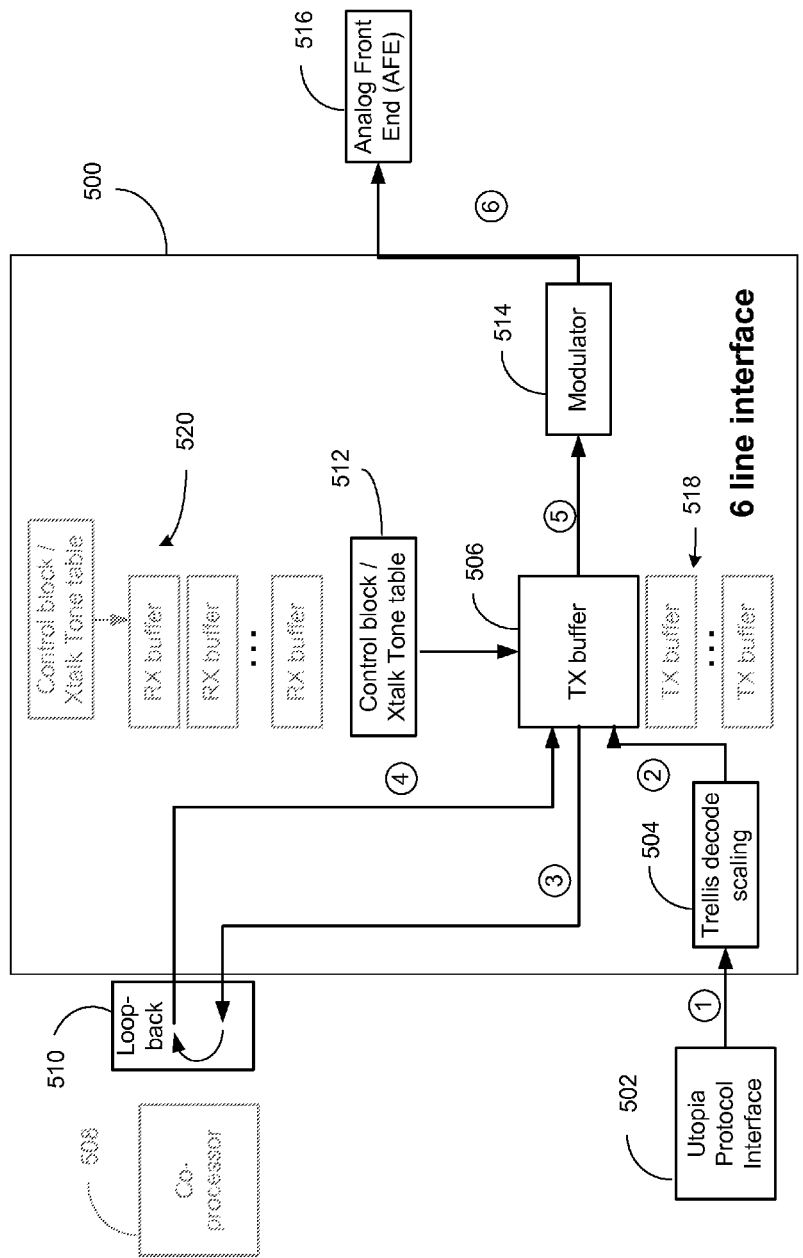
FIG. 5 is a block diagram of a line interface illustrating an alternate transmit data path.

FIG. 5 is a block diagram of an embodiment of a line interface 500 illustrating an alternate transmit data path. Circled numbers depict data flow order. The line interface 500 may be similar to the line interface 400 of FIG. 4. As with the alternate configuration for the receive-side, the difference between this embodiment and that of FIG. 4 is the loopback circuit 510. To review the circuit, data from a Utopia protocol interface 502 for example may be sent to a transmit input circuit 504 and from there to a transmit buffer 506. Operation of the transmit buffer 506 may be the same as that of FIG. 4 with the exception that data sent to the coprocessor circuit 508 is actually received back unmodified via a loopback circuit 510.

The control block 512 may manage data transfer to the loopback circuit 510 in the same manner as if the loopback circuit 510 were the coprocessor 508. In some embodiments, the control block 512 may have knowledge of the presence of the loopback circuit 510 to account for processing delays that would normally be incurred in the coprocessor 508. Data from the transmit buffer 506 may be sent to an output circuit 514 for modulation and then sent to an analog front end 516 for transmission to a subscriber (not depicted).

Figure 6:
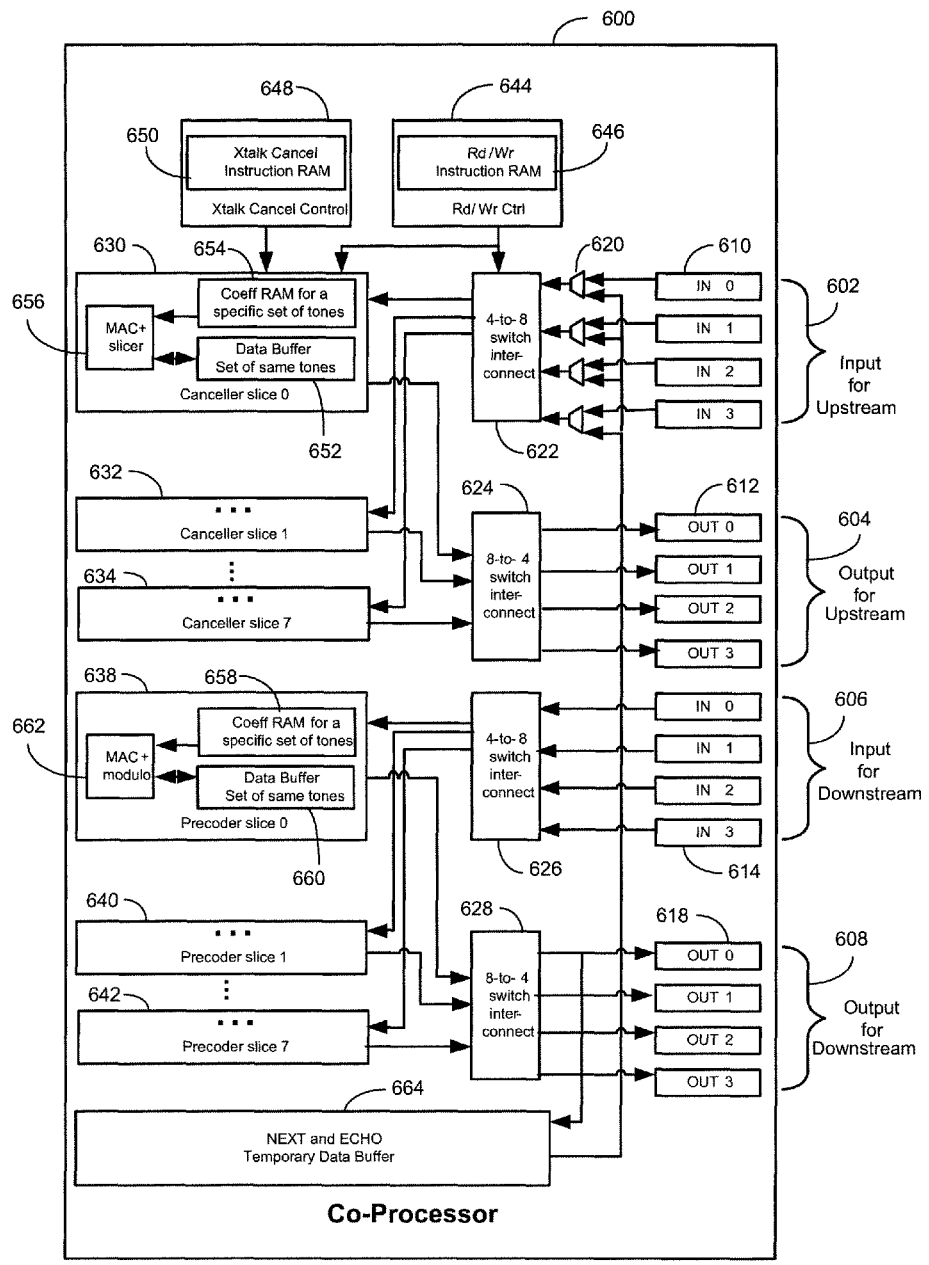
FIG. 6 is a block diagram of a signal coprocessor.

FIG. 6 is a block diagram of an embodiment of a signal coprocessor 600. The signal coprocessor 600 may be similar to the one illustrated in FIG. 1, although, as mentioned above, the data width and the number of line interfaces supported may be greater or fewer depending on the application. The signal coprocessor 600 may support both upstream and downstream communication signals. The upstream signals come from a premise, e.g. subscriber 102, and are destined for the backbone 106. The downstream signals originate at the backbone 106 and are destined for the premise, e.g. subscriber 102.

An upstream input 602 may have a corresponding upstream output 604. Similarly, a downstream input 606 may have a corresponding downstream output 608. The upstream input 602 may include individual input ports 610 and the upstream output 604 may have individual output ports 612. The downstream input 606 may have individual input ports 614 and the downstream output 608 may have individual output ports 618. The exemplary circuit of FIG. 6 has four individual ports for each of the inputs and outputs 602, 604, 606, and 608 that correspond to four line interfaces, for example, line interfaces 116, 118, 120, 124 of FIG. 1.

The upstream input 602 may have a series of multiplexers 620 that select data from one of the input ports 610 or from a downstream data buffer 664. The downstream data buffer 664 stores data used for near-end crosstalk cancellation, as discussed in more detail below. A first switch interconnect or inbound switch matrix 622 couples any one of the four upstream input ports 610 with any one of the eight input signal processors represented by signal processors 630, 632, 634. A second switch interconnect 624 couples any of the eight input signal processors 630, 632, 634 with any of the upstream output ports 612.

A third switch interconnect 626 couples any of the four downstream input ports 614 with any of the eight output signal processors 638, 640, or 642. A fourth switch interconnect 628 couples any of the eight output signal processors 638, 640, or 642 with any of the four downstream output ports 618. The operation of the switch interconnects 622, 624, 626, and 628 is discussed in more detail with respect to FIGS. 8A and 8B.

A read/write instruction controller 644 may include a read/write instruction memory 646. The controller 644 is used to manage switch interconnect settings for moving data to and from the correct line interfaces 116, 118, 120, 122. The instruction memory 646 has data that is used to coordinate with the line interface master controller 128 of FIG. 1 for routing signals on the same tone to a common input signal processor 630, 632, 634, or common output signal processor 638, 640, 642. A crosstalk cancellation controller 648 includes a crosstalk cancellation memory 650 for storing algorithm instructions and coefficient data for use in processing signals. Because the crosstalk cancellation process is similar for each tone, the algorithm instructions may be shared across signal processors 630, 632, 634 and 638, 640, 642 in a SIMD (single instruction, multiple data) fashion, with per tone variations accommodated by different coefficient data.

Each input signal processor 630, 632, 634 has a corresponding data buffer 652 for storing input signal information, a corresponding coefficient memory 654 for storing instructions and calculation coefficients, and a corresponding arithmetic unit 656 that may include, for example, a multiply and accumulate block.

Each of the output signal processors 638, 640, 642 also have a corresponding output signal data buffer 660, a corresponding coefficient memory 658, and a corresponding arithmetic unit 662 that may include, for example, a multiply and accumulate block, or a modulus math function for precoding transmission data. The coefficient memory 658 may store crosstalk cancellation instructions, other filtering instructions, calculations coefficients, etc.

The calculation coefficients for both the input and output signal processors 630, 632, 634 and 638, 640, 642 respectively, may be specific for each signal processor and may be set up per tone according to calibration data. Given the specific nature of the calibration, individual signal processors may be set up and dedicated for use with one tone. In some circumstances, more than one signal processor may be dedicated to the same tone. For example, if more than one pair of lines experience high levels of crosstalk two at a time, but not across the sets of pairs, each pair of signal lines may require treatment that cannot be serviced by a single signal processor. In this case, the line pairs may be directed to separate signal processors even though they are on the same tone. Similarly, one signal processor may handle more than one tone in other embodiments.

The master controller 128, crosstalk tone tables 210, 410, and read/write instruction memory 646 contain coordination data for managing data transfers, sequencing, and timing. However, the architecture shown is only one possible embodiment. Other embodiments could include, but are not limited to, a master controller function in the coprocessor 124 that coordinates all transfers for both the coprocessor 124 and line interfaces 116, 118, 120, 122, or an external master controller (not depicted) in a standalone support chip (not shown) that feeds transfer information and synchronization data to both the coprocessor 124 and the line interfaces 116, 118, 120, 122.

Figure 7:
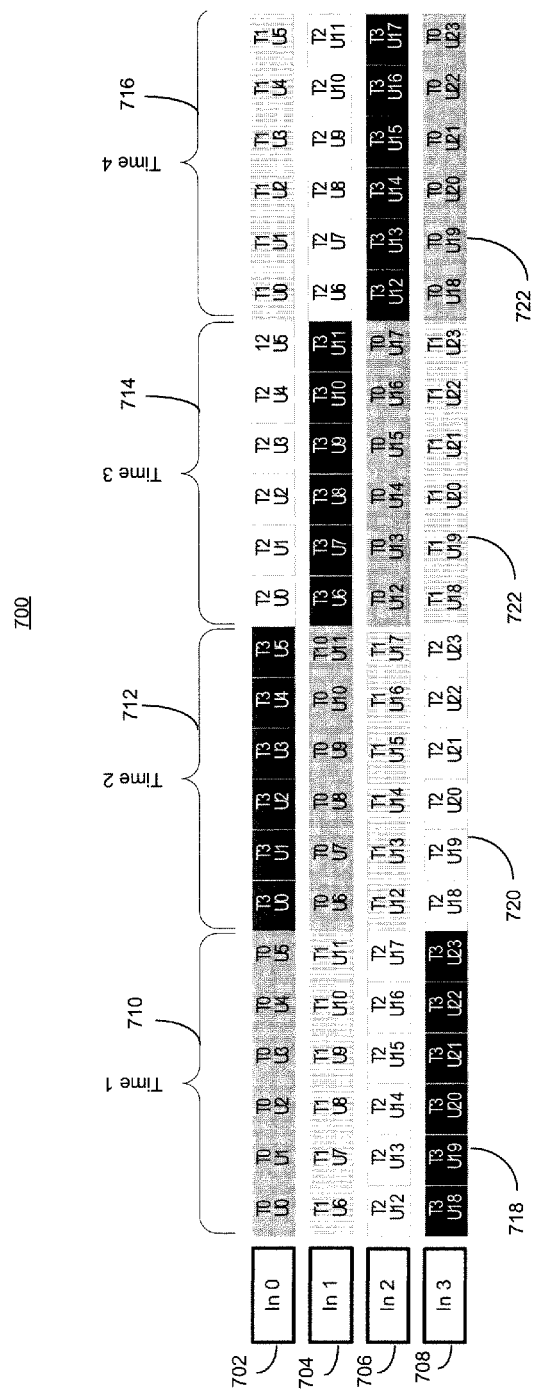
FIG. 7 is a representative data input stream to the signal coprocessor.

FIG. 7 illustrates a representative data stream 700 from a number of line interfaces to a coprocessor such as the coprocessor 600 of FIG. 6. FIG. 7 illustrates data as it may be received at the four upstream inputs 610 of the coprocessor 600, with Input 0 702, Input 1 704, Input 2 706, and input 3 708. Each of the inputs 702, 704, 706, 708 correspond to an upstream output from a line interface, and thus, in this illustrative example, a system with four line interfaces is shown. For the purpose of illustration, each of the four line interfaces will be assumed to have six users on each of four tones, for a total of 24 users supported by each line interface.

The data shown represents one transfer time slot that transfers a quantity of data that will be processed at one time in the coprocessor 600. Because, in the exemplary embodiment, each tone is processed at a single signal processor, e.g., signal processor 630, four signal processors in the coprocessor 600 are included. In other embodiments, fewer or more tones may require a corresponding number of signal processors. Given the example user parameters above, the transfer time slot comprises 24 data cycles, divided into four time segments.

Reading from left to right along Input 3 708, the first time segment 710 includes 6 data cycles 718 having data on tone 3 (T3) for users U18-U23. At the second time segment 712, data 720 for users U18-U23 on tone 2 is transferred. At the third time segment 714, data 722 for users U18-U23 on tone 1 is transferred. And finally, at the fourth time segment 716, data 722 for users U18-U23 on tone 0 is transferred.

Reading from top to bottom at any of the four time segments 712, 714, 716, 718, it is easily seen that each input receives a separate tone for a given time segment. Because each tone is destined for a single input or output signal processor, e.g. tone 0 is sent to input signal processor 630, making sure that each line interface 116, 118, 120, 122 transmits like tone data at separate times allows the destination signal processor to manage a single input stream at a time. Architecturally, this may help eliminate the necessity of separate data buffer in the coprocessor 600 to manage simultaneous arrival of signals from more than one line interface 116, 118, 120, 122. The designation of transfer time slots and coordination between the individual line interface modules line interfaces 116, 118, 120, 122 as well as between the line interface modules and the coprocessor 124 is done by the master controller 128 (all of FIG. 1) and crosstalk tone tables, e.g. tone table 210 of FIG. 2.

Figure 8A:
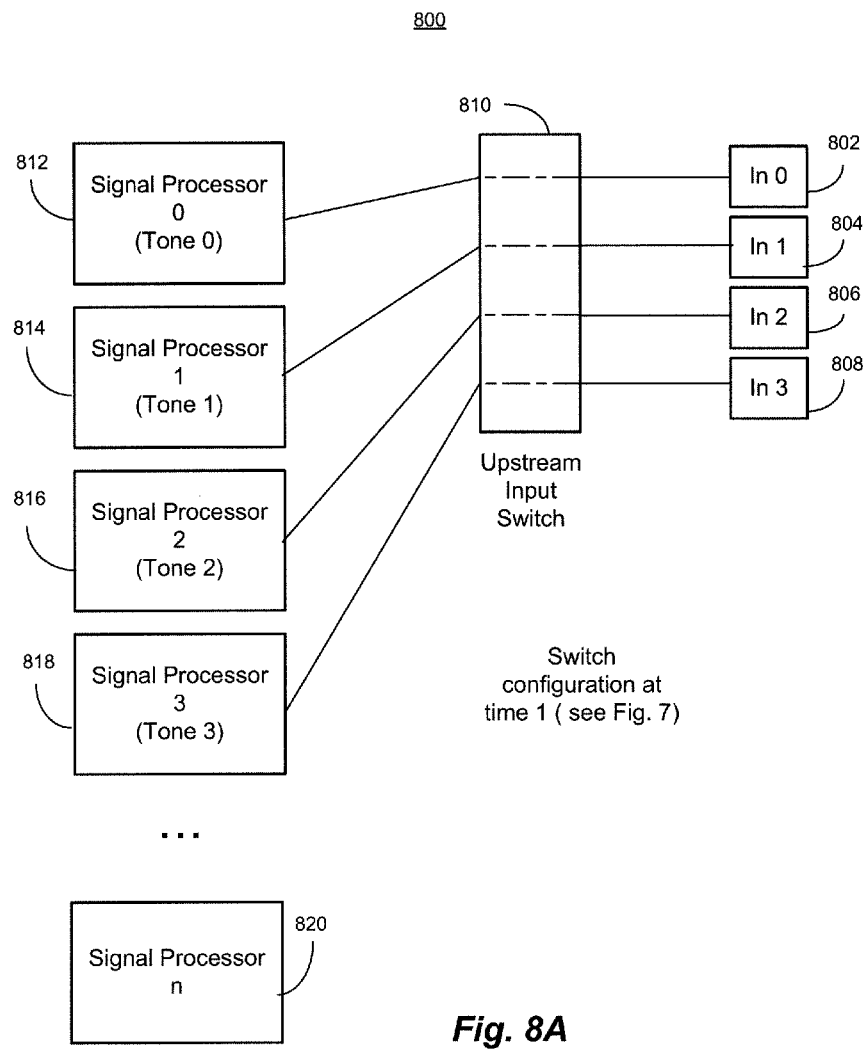
FIGS. 8A and 8B illustrate switching paths in the signal coprocessor.

Turning to FIG. 8A, switching paths in a coprocessor 800 at time segment 1 (710 of FIG. 7) are discussed. The coprocessor 800 has inputs 0-3, 802, 804, 806, and 808 respectively. Each input is coupled to a switch matrix 810, in this illustration an upstream switch matrix such as 622 of FIG. 6. The architecture of a downstream channel may be correspondingly similar.

As shown in FIG. 8A, the data from time segment 1 710 of FIG. 7 is fed to each input 0-3. Because tone 0 appears at input 0 802, and signal processor 0 812 is handing tone 0, the switch is configured to send input 0 802 to signal processor 0 812. Similarly, tone 1 appearing on input 1 804 is directed to signal processor 1 814, tone 2 appearing on input 2 806 is directed to signal processor 2 816, and tone 3 appearing on input 3 808 is directed to signal processor 3 818. Additional signal processors, represented by signal processor n 820 are not used in this configuration.

Figure 8B:
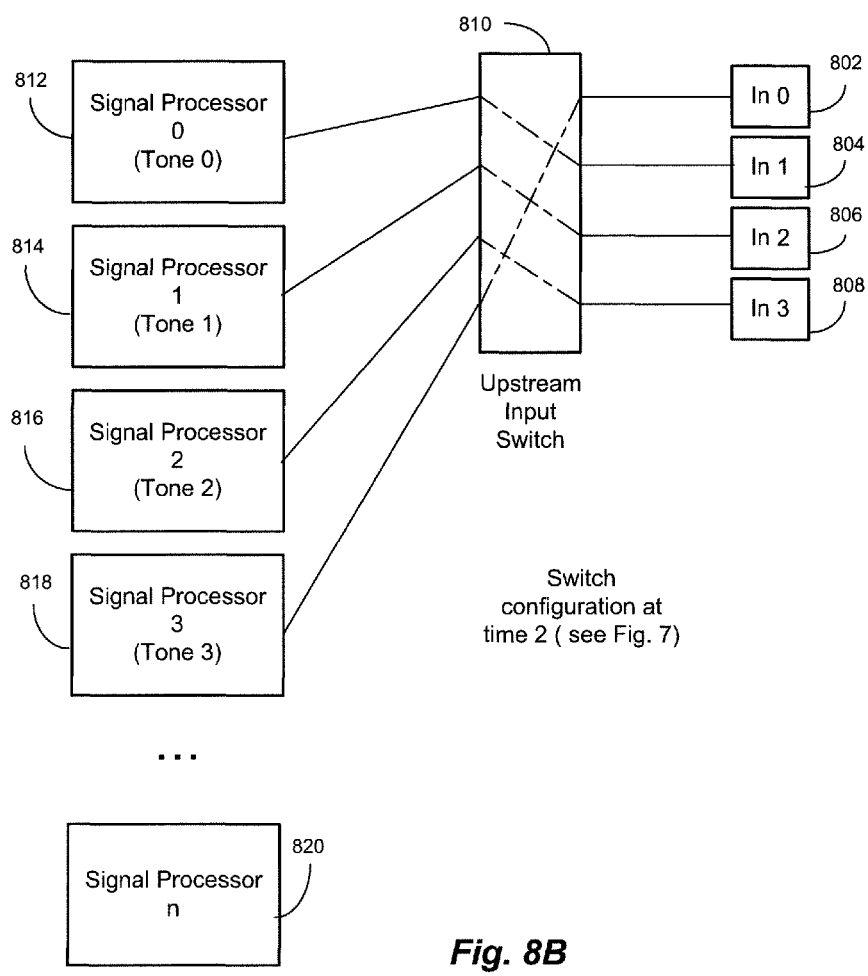

FIG. 8B illustrates the switching paths in the coprocessor 800 at time segment 2 (712 of FIG. 7). As shown in FIG. 8B, the data from time segment 2 712 of FIG. 1 is fed to each input 0-3 802, 804, 806, 808 respectively. Tone 3 now appears at input 0 802. Signal processor 3 818 is processing tone 3, so the switch matrix 810 is configured to send input 0 to signal processor 3 818. Similarly, tone 0 appearing on input 1 804 is directed to signal processor 0 812, tone 1 appearing on input 2 806 is directed to signal processor 1 814, and tone 2 appearing on input 3 808 is directed to signal processor 2 816. Additional signal processors, represented by signal processor n 820 are not used in this configuration.

As highlighted by the switching configurations of FIGS. 8A and 8B, the single switch matrix 810 is able to route all data to the appropriate signal processor 812, 814, 816, 818 because the data for an individual processor arrives sequentially rather than simultaneously, as might occur if no coordination were used. However, in a system where no coordination between line interfaces and coprocessor was used, a time slot data buffer (not depicted), for example, in the coprocessor 800, could receive all the data from each line interface and subsequently route it to the appropriate signal processor by tone.

Figure 9A:
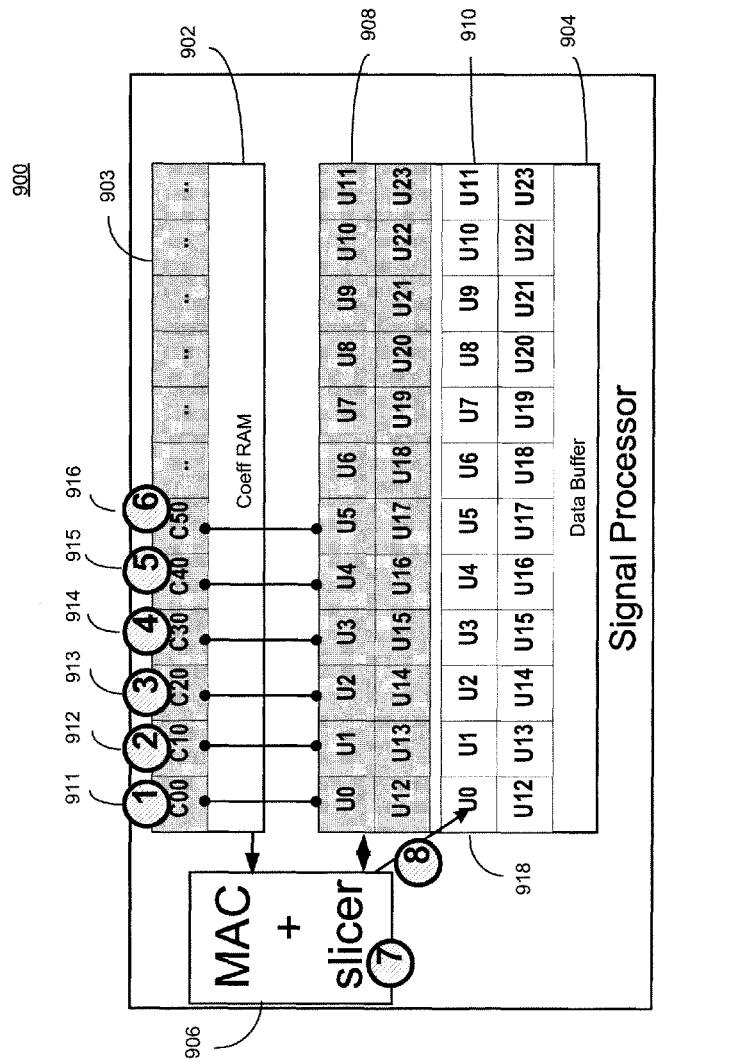
FIGS. 9A and 9B are block diagrams of a signal processor.

FIG. 9A shows a block diagram of an embodiment of a signal processor 900, similar to signal processor 630 of FIG. 6. The signal processor 900 includes a coefficient memory 902, a data buffer 904 and an arithmetic unit 906. The coefficient memory has data locations 903 and the data buffer has input data locations 908 and output data locations 910. The arithmetic unit 906 is shown configured for upstream data processing with a multiply and accumulate block, with a slicer for selecting constellation data.

The data buffer 904 may be designed to hold all data from a fully utilized process data set. In some cases, the process data set may be much smaller than the data buffer 904.

In operation, the signal processor 900 may be used for linear filtering, crosstalk subtraction, etc. For linear filtering, a user data and coefficient data pair U1-C00 911 may be fed to the arithmetic unit 906 and multiplied. The result may be stored inside the arithmetic unit 906. To filter among multiple users, this process is repeated, for example, using user data/coefficient pairs U1-C10 through U5-C50 912-916. After looping through multiple users, the data can be sliced to a specific constellation and can then be written back to the same output data location, for example, for user 0, U0 918.

The results can be written back in place or written to a new location, depending on whether the connect algorithm needs the processed result. This is discussed in more detail with respect to FIG. 9B.

Figure 9B:
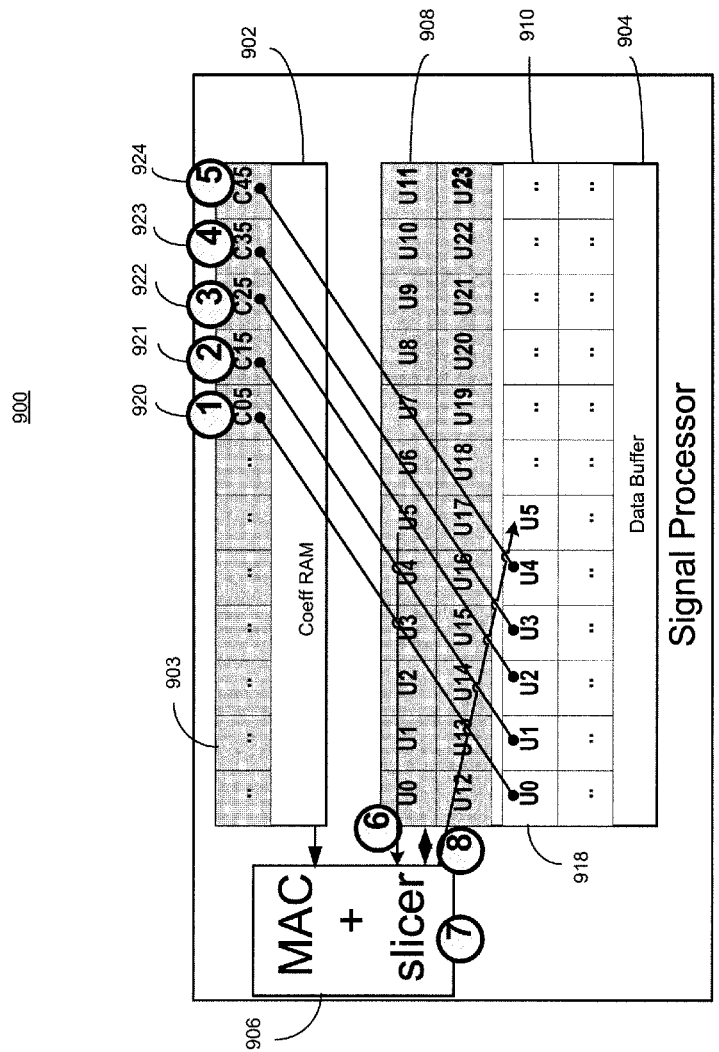

FIG. 9B shows a different view of the block diagram of the embodiment of the signal processor 900 of FIG. 9A. Crosstalk subtraction using processed data is illustrated using an exemplary embodiment. In this example, crosstalk subtraction for user data U5 of user data 908 is provided to the arithmetic unit 906. Output data 910 for U0-U4 are stored in coefficient memory 902 at locations 920-924. This may be appropriate when the initial coefficients and algorithm that produced results U0-U4 are correctly selected and produce a better result than the initial user data U0-U4 as shown in FIG. 9A. After processing with the prior results data, the result for U5 may be sliced to a specific constellation and written to location U5 in the output data 910.

Because for each user the sources of cross-talk can be different, the above-mentioned processing should be flexible enough to pick an appropriate set of data for each user to be processed. Crosstalk interference tends to be stable because proximity is the greatest contributor to crosstalk and the physical cable plant is stationary. Therefore, instructions for crosstalk computation requirements for each user can be pre-computed and can be stored in the instruction memory 650 of FIG. 6.

From tone to tone, the crosstalk behavior variation (relative to a user) may be relatively small. Therefore, the same configuration may be reused by multiple tones. Minimally, the configuration information can be shared among all the signal processors in a Single Instruction, Multiple Data (SIMD) fashion. That is, the instruction set for calculations may be shared among the signal processors 630, 632, 634, 638, 640 and 642 of FIG. 6.

An embodiment of an internal scheduling method in a coprocessor such as co-processor 600 of FIG. 6 will be discussed with respect to FIGS. 10-12.

While a transfer time slot, or sync mark, is the time allocated for processing one data symbol, an internal schedule defines the processing timing of each data tone. To maintain high level of flexibility, a sync mark duration may be divided into small time periods known as processing time slots. The processing time slot Pslot is defined as the average processing time allocated for processing a process data set worth of data.

The Pslot may be equal to the time required to transfer a Process Data Set worth of data (Tslot) multiplied by a ratio between the number of signal processors and the number of inputs and outputs, i.e.:

$$Pslot = \text{time to transfer a process data set} \times \left(\frac{\text{\# signal processors}}{\text{\# of I/O links}}\right) = Tslot \times Nd \times \left(\frac{\text{\# signal processors}}{\text{\# of I/O links}}\right)$$

where Nd is the number of users.

In one exemplary embodiment supporting 24 users, the clock rate of the signal processor may be 282 MHz and the I/O data rate at input 610 and output 612 may be 3 GHz. The number of bits per data word may be 32. Therefore, the Time slot is:

$$Tslot = 32 \times \left(\frac{282e6}{3e9}\right) = 3 \text{ cycles}$$

and the Pslot is $$Pslot = 3 \times 24 \times \left(\frac{8}{4}\right) = 144 \text{ cycles}$$

The average processing time available for one user tone is given by (example assuming downstream):

$$\left(\frac{Tslot}{24}\right) \approx 6 \text{ cycles}$$

This allows pre-filtering or crosstalk pre-subtraction with at least 6 users on average or both for 4 users on average.

Assuming that only linear filtering or crosstalk subtraction is performed, the total number of cross-talkers to be cancelled within one tone can be anything less than or equal to 144:

i.e. $\sum_{i=1}^{24}[Crossstalkers \text{ to cancel}]_i = 144$

With one additional bank of processing buffer per signal processor, four tones can be processed together as long as the following constraints are satisfied:

$$\sum_{j=k}^{k+3}\left\{\sum_{i=1}^{24}[Crosstalkers \text{ to cancel}]_i\right\}_j = 580$$

$$\sum_{i=1}^{24}[Crosstalkers \text{ to cancel}]_i < 290$$

It should be noted that while instruction controls are shared among signal processors, the pairing mentioned above may be done for multiple sets of data.

Figure 10:
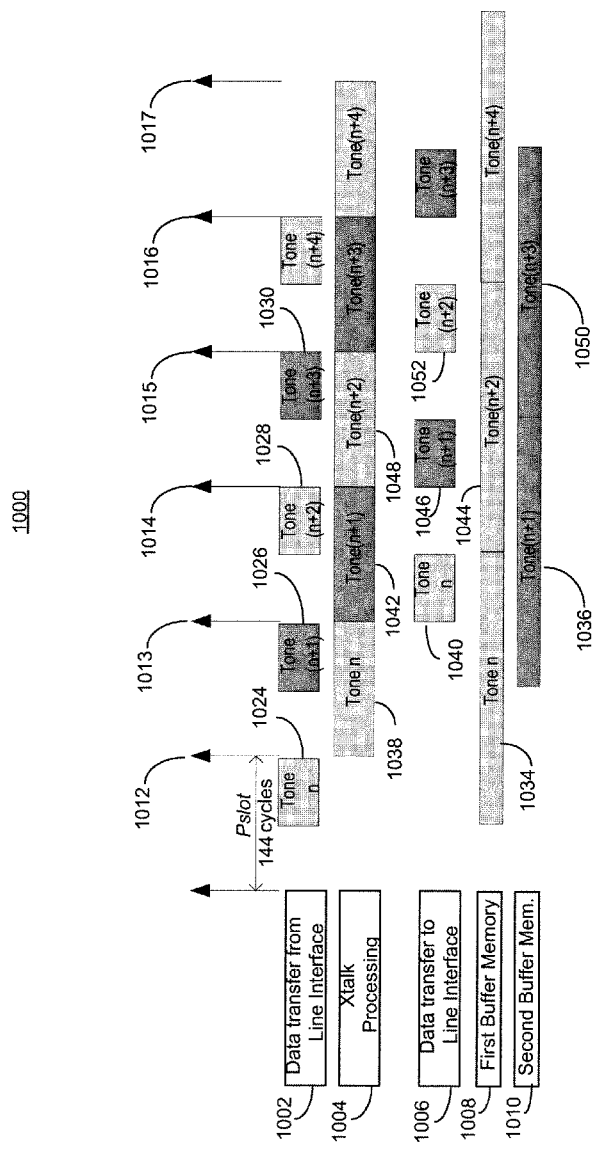
FIG. 10 is a sequence of tone data in and out of a signal processor.

FIG. 10 shows an example of internal scheduling of a signal processor using processing slots. The internal scheduling allows an individual signal processor, e.g. signal processor 900 of FIG. 9A, to read in new data, read out results data, and process current data. The arithmetic unit is fully loaded, providing the most efficient use of the signal processing resources.

The internal schedule 1000 shows a sequence of time-based rows arranged by function/location. The rows include inbound data transfer 1002, signal processing 1004, outbound data transfer 1006. Additionally, the contents of a first buffer memory 1008 and a second buffer memory 1010 show data as it is stored during transfer and processing.

A series of Pslots 1012-1017 include evenly spaced time slots. Tone(n) 1024 arrives from the line interface and is stored in the first buffer memory 1008 during a duration 1034. Tone(n) 1038 is processed during time period: 1012-1013. In the latter half of time period 1012-1013, tone(n+1) 1026 is transferred in and stored in the second buffer memory 1010 at 1036. Tone(n+1) 1042 is processed while tone(n) 1040 is transferred out. After the first buffer memory 1008 is cleared of tone(n) 1034, tone(n+2) 1028 may be input and is stored in the first buffer memory 1044. This interleaving continues with the processing of tone(n+2) 1048.

When tone(n+1) 1046 is output, the second buffer memory 1010 may be cleared, or simply overwritten with tone(n+3) 1030, as depicted by tone(n+3) 1050. When processing of tone(n+2) 1048 is completed, the results 1052 may be output and memory buffer 1 1008 cleared of data 1044 and made available for subsequent processing.

The process example illustrated in FIG. 10 assumes that each tone requires the same amount of processing. However, in practice, some tones may require more processing and some tones less. It is possible that certain tones may not require any crosstalk cancellation processing at all, for example.

Given the definition of Pslot, the average processing time available for one user data is given by:

$$\left(\frac{Pslot}{Nd}\right) = Tslot \times \left(\frac{\text{\# of signal processors}}{\text{\# of IO links}}\right)$$

While this is the average number, the actual time to be allocated for one user data can vary on a data to data basis as long as the total cycles consumed for one Process Data Set is less than or equal to Pslot, for example:

$$\sum_{i=1}^{Nd}[\text{Time to process tone}]_i = Pslot$$

By using this characteristic, tones with more processing requirements may be paired with tones having lower processing requirements to keep within the Pslot time limit.

Figure 11:
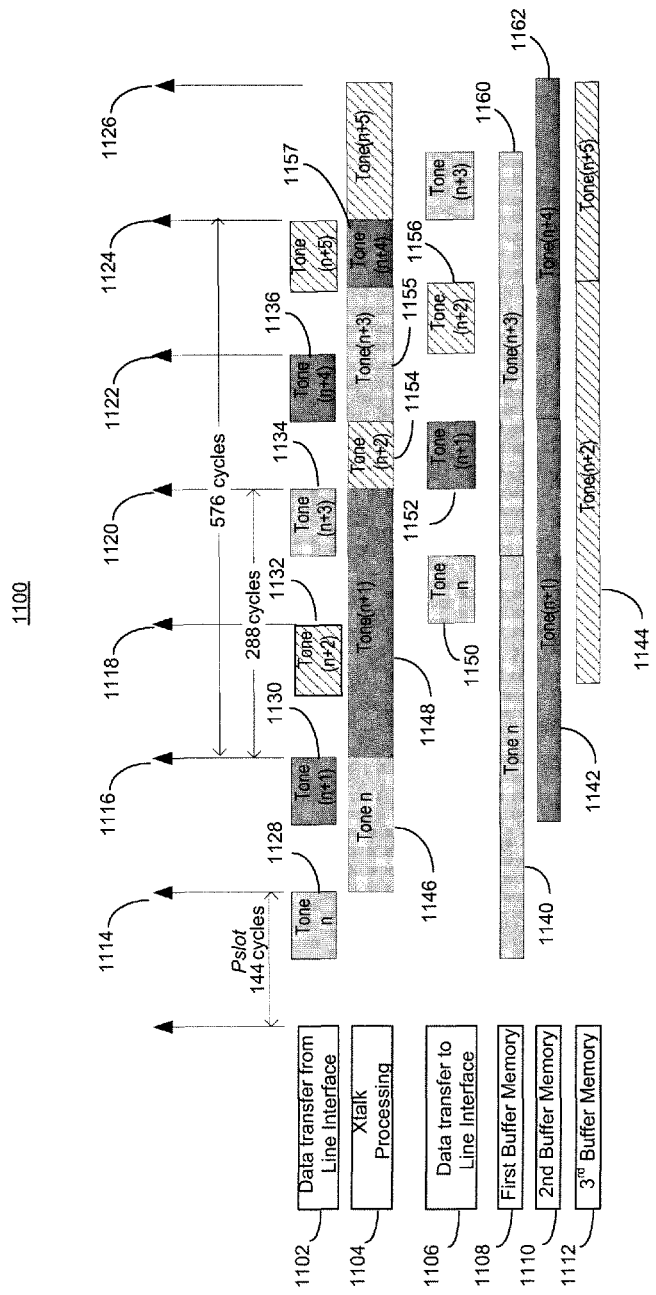
FIG. 11 is an alternate sequence of tone data in and out of a signal processor.

FIG. 11 is a variation of the example illustrated in FIG. 10 showing how the use of an additional buffer memory may be used to allow variable processing times while still using the same slot times for data loading and unloading. When the I/O characteristics for data loading and unloading of the signal processor 900 remain constant, the line interface units 116, 118, 120, 122 may continue to operate on their previously established schedule, even though the internal timing of the signal processor 900 is altered.

FIG. 11 includes rows showing the timing of inbound data transfer 1102, processing 1104, and outbound data transfer 1106. Three additional rows show the timing of data in each of three buffer memories 1108, 1110, and 1112. A series of Pslots ending at lines 1114, 1116, 1118, 1120, 1122, 1124, 1126 are illustrated.

Instead of storing tone in buffer memory data for 2 Pslot times, as shown in 1008, 1010 of FIG. 10, data in FIG. 11 is stored for 3 Pslots. This allows, for example, tone(n) 1128 to be processed at 1146 but not delivered until after the arrival of both tone(n+1) 1130, which requires more processing than average, and tone(n+2) 1132, which requires less. The determination of processing requirements may be made during line quality testing of processing requirements for example.

At the slot ending at 1114, tone(n) 1128 is loaded and stored in the first buffer memory 1108 at 1140. Tone(n) 1146 is processed until the end of period 1116. At the same time tone(n+1) 1130 is received and stored at 1142 in the second buffer memory 1110. Processing of tone(n+1) 1148 begins and continues through two full Pslots, from boundary 1118 to boundary 1120.

During this period tone(n) 1150 is still being output and uses the first buffer memory 1108. Tone(n+1) is still processing and occupies the second buffer memory 1110. Therefore, to load tone(n+2) 1132, the third buffer memory 1112 is used. At the completion of processing for tone(n+1) 1148, tone(n+2) 1154 may begin its shortened processing cycle, ending approximately half way between Pslot boundaries 1118 and 1120. Because tone(n+1) used two full Pslots and tone(n+2) used one half, the sum is still over an allowable one Pslot average per tone. Tone(n+4) 1136 may be loaded into the second memory buffer 1110, and stored as tone(n+4) 1162. Processing tone(n+4) 1157 also takes one half of a Pslots and returns the average time for tone processing to one Pslot, even though tone(n+4) 1157 is processed after the full cycle processing tone(n+3) 1155.

As shown in FIG. 11, the addition of the third buffer memory allows the two Pslot cycle of FIG. 10 to be elongated to a three Pslot cycle, that is, the time from the first arrival of tone data until the corresponding processed tone data is delivered is 3Pslots. Another way of viewing cycle time is the number of durations that a tone exists in a buffer memory. In this example, tone(n+2) 1144 is stored for three Pslot times even though it only requires one half of a Pslot for its own processing. In the two buffer memory of FIG. 10, tone data must be moved through in two Pslot cycles in order to maintain throughput.

Figure 12:
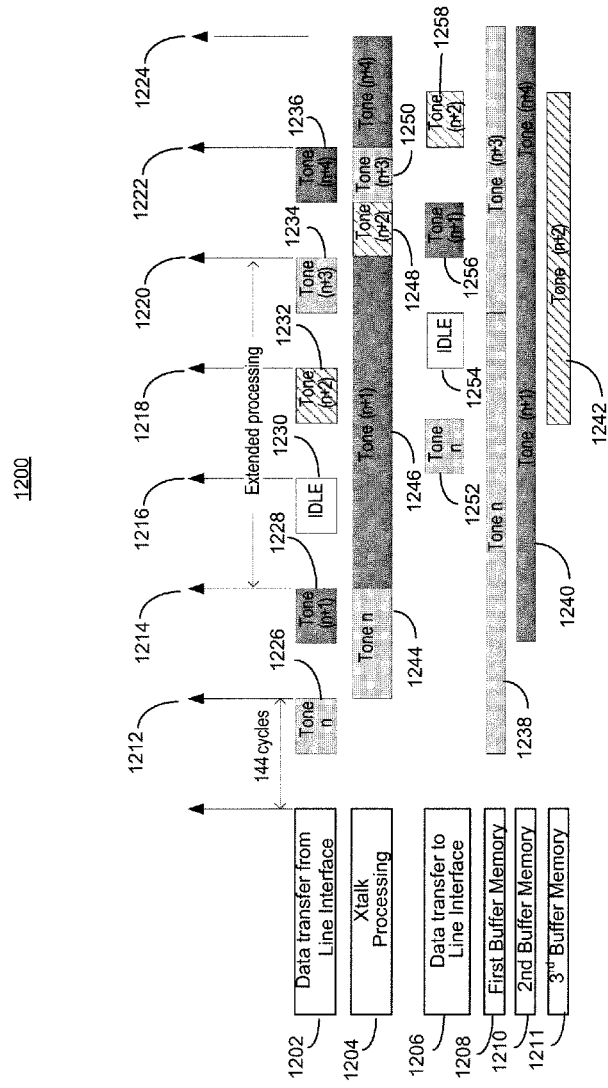
FIG. 12 is yet another sequence of tone data in and out of a signal processor.

FIG. 12 illustrates another example method for managing extended processing time requirements. As in FIG. 11, rows represent input data transfer 1202, crosstalk processing 1204, output data transfer 1206, as well as a first buffer memory 1208, a second buffer memory 1210, and a third buffer memory 1211.

A series of Pslot times 1212-1224 are used to represent internal cycles of a signal processor, such as signal processor 900 of FIG. 9A. Data for different tones 1226, 1228, 1232, 1234, and 1236 arrive for processing in sequence at the end of each Pslot 1212-1224. However, in order to provide for extended processing of tone(n+1) 1246, an idle tone 1230 is inserted in the stream. The idle tone 1230 does not take any processing time, allowing tone(n) 1244 to process in the standard single Pslot, tone(n+1) 1246 to process in one additional Pslot ending at 1218. The third Pslot, ending at 1220, used for processing tone(n+1) is made possible by the half cycle processing of tone(n+2) 1248 and tone(n+3) 1250. Because the idle tone 1230 does not consume any memory, tones (n) and (n+1) 1238, 1240 are able to occupy the first and second memories 1208 and 1210 for 4 Pslot periods, rather than the three of FIG. 11.

The inclusion of an idle tone may be facilitated by the cooperation of the master controller 128 of FIG. 1. Each line interface 116, 118, 120, 122 should refrain from sending data to that signal processor during the idle period and conversely, should not expect data during the corresponding output period 1254.

In some cases, individual users may have low coupling and therefore crosstalk interference may not be a significant problem. These users may be excluded from crosstalk cancellation and their data may not need to be communicated to the coprocessor 124. Excluding users may be of value when each line interface 116, 118, 120, 122 has at least one user that can be excluded. Otherwise the other line interfaces will have to lay idle while the one sends user data in a given slot.

The value of Pslot for processing can then be adjusted according to the smallest number of excluded users at any line interface:

$$Pslot = 3 \times (24 - \min(excluded\_users)) \times \left(\frac{8}{4}\right)$$

The average number of cross-talkers that can be cancelled would remain the same, but since the Pslot is shortened, there is a potential to do cancellation for more tones.

In some cases, the tone processing requirements may be less than that available processing. In this case, either the signal processor may lie idle, or processing may be increased for a tone even though the marginal improvement of such processing may be minimal.

Figure 13:
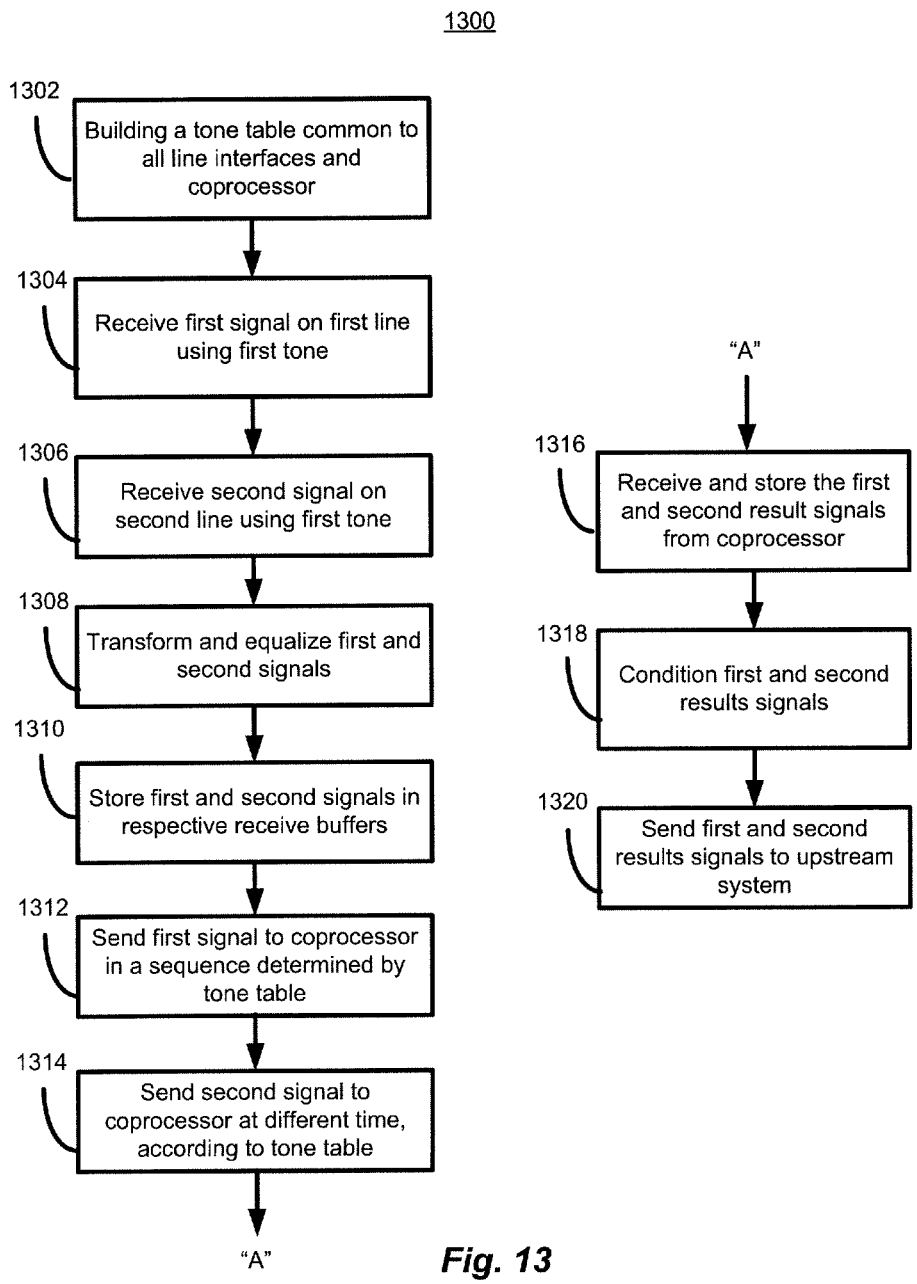
FIG. 13 is a method of processing an upstream signal at a line interface.

FIG. 13 is an embodiment of a method 1300 of processing data signals received at a line interface, where the data signals are subject to crosstalk signal degradation. In a discrete multitone (DMT) environment, a first and second signal 108, 110 may be carried on up to 256 channels or tones with a bandwidth of approximately 4.3125 KHz each. As discussed above, when physical circuits, such as line pairs, are in close proximity, electromagnetic coupling may take place and crosstalk signal degradation may result. This is especially true when proximate circuits are on the same tone. Crosstalk noise cancellation or reduction is possible when interfering signals can be compared and operated on jointly. The success of crosstalk cancellation may be a function of signal quality in view of noise and signal strength. Part of the initial set up of the system 100 for example, may determine what lines are susceptible and what tones are involved.

At block 1302, a tone table 210 may be built that specifies what tones have significant crosstalk potential. The tone table may be shared by all line interfaces 116, 118, 120, 122 of FIG. 1 and may be used to supply information that establishes the sequence for sending and receiving signals between the line interfaces 116, 118, 120, 122 and coprocessor 124. The tone table 210 may also include information for the coprocessor 124 such as algorithm information and processing coefficients for use in executing the crosstalk cancellation algorithms.

At block 1304, the signals may be received at the line interfaces 116, 118, 120, 122. The signals may be inbound from a subscriber premises 102 or outbound from a network backbone 106. In this example, a first signal may be received from a subscriber on a first line 108. The first subscriber line 108 may be coupled to a first line interface 116.

At block 1306, a second signal may be received at one of the line interfaces 116, 118, 120, 122. The second signal may also be inbound on a second subscriber line 110, in keeping with the exemplary embodiment of the previous paragraph. The second line 110 may be coupled to any of the line interfaces, for example 118.

At block 1308, both the first and second signals may be demodulated using a fast Fourier transform and have coarse equalization performed. At block 1310, each of the first and second signals may be stored in respective receive buffer memories in the line interface 116, 118, 120, 122, e.g., receive buffer 206.

At block 1312, the first signal, or portions of the first signal using the first tone, are sent to the coprocessor 124, at a time and in a sequence specified by the crosstalk tone table 210. At block 1314, the second signal, or portions of the second signal using the first tone are sent to the coprocessor 124, at a time and in the sequence specified by the crosstalk tone table 210. As discussed above with respect to FIG. 7, other tones may also be sent in the sequence, as long as tones destined for the same signal processor are not sent at the same time.

At block 1316, the line interfaces 116, 118, 120, 122 may receive results data for the first and second signals and store them in respective buffer memories. Returning the results to the line interfaces 116, 118, 120, 122 establishes an architecture that allows operation with or without a coprocessor 124, by simply looping back data from blocks 1312 and 1314.

At block 1318, data from the respective buffer memories 206, 216 may be read out to a block 212 for further signal conditioning, such as secondary equalization and trellis coding. At block 1320, the resulting signals may be supplied to an upstream system, for example, a telephone company data backbone using a Utopia protocol interface 214, or any other suitable protocol.

Figure 14:
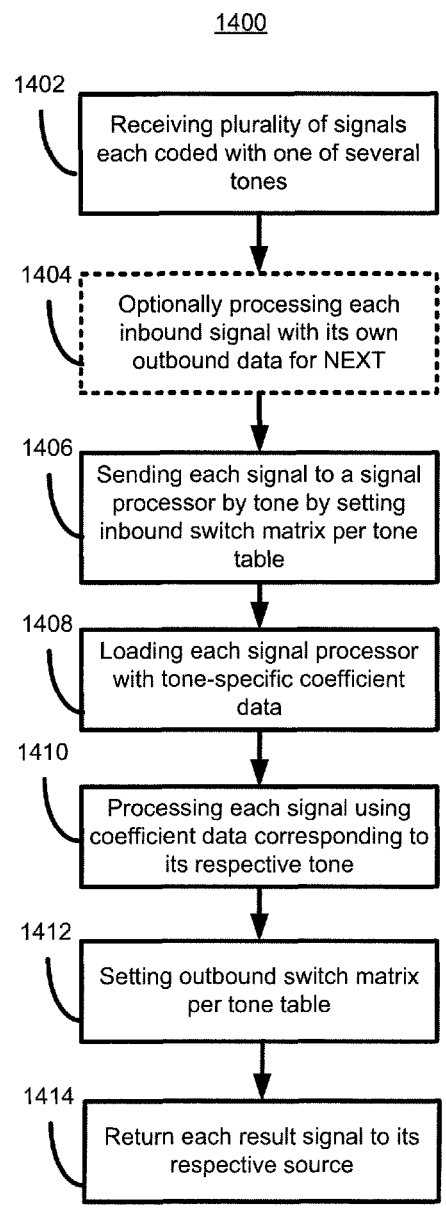
FIG. 14 is a method of processing an upstream signal at a signal processor.

FIG. 14 is an embodiment of a method 1400 of operating a dedicated coprocessor on data signals having a common tone that are subject to crosstalk interference.

At block 1402, signals are sent from the line interfaces 116, 118, 120, 122 in a sequence determined by tone table data, such as from tone table 210 of FIG. 2. Each signal may be associated with a tone used to modulate the signal during transmission from its respective subscriber 102, 104.

At block 1404, outbound signal data stored in memory 664 of FIG. 6 may be made available to a signal processor 630, 632, 634 for use in near-end crosstalk cancellation (NEXT). The outbound signal data should be made available to the signal processor handling the associated inbound signal. In some embodiments, NEXT is not performed and outbound signal data is not stored or made available to a signal processor.

At block 1406, information from the tone table 210 is used to set an inbound switch matrix 622 to direct all signals using the same tone to a single signal processor handling that tone. The tone table 210 specifies the order in which signal data is received, so that the inbound switch matrix 622 may be set accordingly by read/write instruction controller 644.

At block 1408, signal data is loaded according to tone into signal processors 630, 632, 634, and according to the needs for crosstalk cancellation. In the exemplary embodiment of FIG. 6, eight signal processors are available for upstream linear filtering and crosstalk cancellation. In other embodiments, that number may be different, according to system needs. For example, new techniques may extend the distance over which digital subscriber line (DSL) technology may be used, which could require more crosstalk cancellation. Conversely, so called 'fiber to the curb' technology could reduce the demands for crosstalk cancellation.

At block 1410, each signal processor 630, 632, 634 may be loaded with coefficient data from the coefficient memory 654 specific to each tone and the type of processing being performed, for example, linear filtering, crosstalk cancellation, etc. When signal data loading is complete, processing may begin. The algorithmic processes are more or less similar between signal processors 630, 632, 634 to the extent that SIMD (single instruction, multiple data) techniques may be applied between signal processors.

At block 1412, tone table data may be used to set a switch interconnect or outbound switch matrix 624 for correctly routing results signals back to their respective sources. The same tone table used for setting the arrival order may be used to route the results signals.

At block 1414, the results data may be returned to their respective sources using the information from the tone table.

Preconditioning processing for downstream signals may follow the same process or a similar process as outlined here.

Line testing can determine the extent to which crosstalk is a problem, allowing models to be developed for which lines and what extent they are susceptible to crosstalk interference. The results of such line testing may be applied to the apparatus described above to optimize the selection and processing power dedicated to correcting crosstalk interference.

A coprocessor and compatible line interfaces allows cost effective crosstalk cancellation processing, as well as any other tone-oriented processing across a much larger set of lines than the prior art. Because the coprocessor is separate from individual line interfaces, the coprocessor may be sized to the requirements of the system without regard to a worst case scenario. This improves the ability of the overall system to improve performance, increase customer satisfaction, and lower cost. When the coprocessor is not required, for either cost or performance reasons, it may simply be replaced with a loop-back circuit.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A central office interface comprising:
 a backbone interface configured to couple to a backbone network;
 at least one line interface module including a plurality of subscriber line interfaces, each of the subscriber line interfaces being configured i) to transmit and receive subscriber line signals via a respective plurality of subscriber lines, and ii) to transmit and receive signals corresponding to the respective plurality of subscriber lines via the backbone interface; and
 a signal module coupled to each of the subscriber line interfaces, the signal module being configured i) to process, for each subscriber line interface, subscriber line signals received from a receive buffer of the subscriber line interface module, and ii) to return the processed signals to the receive buffer of the subscriber line interface for subsequent transmission via the backbone interface.

2. The central office interface of claim 1, wherein the signal module comprises a coprocessor that includes:
a plurality of signal processors, each having i) a data buffer, ii) a coefficient memory configured to store processing settings, and iii) an arithmetic unit; and
a switch matrix operable to direct a communication signal from one of the subscriber line interfaces to one of the plurality of signal processors.

3. The central office interface of claim 2, wherein:
the at least one line interface module comprises a plurality of line interface modules having respective subscriber line interfaces, wherein each of the plurality of line interface modules is coupled to the coprocessor.

4. The central office interface of claim 2, wherein the switch matrix is further operable to direct a multiplicity of related communication signals to a single signal processor.

5. The central office interface of claim 2, wherein the communication signal is a subscriber line signal from a subscriber line.

6. The central office interface of claim 5, wherein the coprocessor performs far-end crosstalk (FEXT) cancellation.

7. The central office interface of claim 2, wherein the coprocessor further comprises:
an output signal data buffer configured to store a subscriber line signal to be transmitted via a subscriber line, wherein at least one signal processor performs near-end crosstalk cancellation using output data from the output signal data buffer.

8. The central office interface of claim 2, further comprising:
a controller configured to manage settings of the switch matrix and operation of each of the plurality of signal processors.

9. The central office interface of claim 1, wherein the at least one line interface module includes a digital subscriber line (DSL) interface module.

10. The central office interface of claim 1, wherein each of the subscriber line interfaces is coupled to the respective plurality of subscriber lines via a respective signal conditioning block.

11. The central office interface of claim 1, wherein each of the subscriber line interfaces includes an equalization and coding block coupled to the backbone interface.

12. The central office interface of claim 1, wherein each of the subscriber line interfaces includes a scaling and de-coding block coupled to the backbone interface.

13. The central office interface of claim 1, wherein each of the subscriber line interfaces includes a modulator configured to modulate subscriber line signals to be transmitted via the respective plurality of subscriber lines.

14. A coprocessor for use in signal processing of communication signals, the coprocessor comprising:
a set of input ports and output ports coupled to a receive buffer or a transmit buffer of a subscriber line interface;
a set of signal processors, each signal processor including i) a data buffer, ii) a coefficient memory configured to store coefficient data, and iii) an arithmetic unit;
a first switch that selectively couples an individual input port to an individual signal processor; and
a memory configured to store control data and executable instructions that determine i) settings of the first switch and ii) operation of the arithmetic unit.

15. The coprocessor of claim 14, wherein the set of input ports and output ports includes:
a receive input port;
a receive output port;
a transmit input port; and
a transmit output port,
wherein the receive input port is for handling an inbound signal from a premise destined for a central office, and the transmit output port is for handling an outbound signal from the central office destined for the premise.

16. The coprocessor of claim 14, wherein the set of signal processors includes inbound signal processors to perform noise cancellation on data from the receive input port.

17. The coprocessor of claim 14, wherein each port is coupled to a plurality of signal lines.

18. The coprocessor of claim 14, further comprising:
a data buffer to store outbound signal data used for near-end noise cancellation.

19. The coprocessor of claim 18, further comprising:
a multiplexer to selectively couple the inbound signal and outbound signal data to one of the signal processors.

20. The coprocessor of claim 14, further comprising:
a second switch that selectively couples data from one of the signal processors to the receive output port.

21. The coprocessor of claim 14, further comprising:
an other switch that selectively couples data from the transmit input port to one of the signal processors.

22. The coprocessor of claim 14, further comprising:
an additional switch that selectively couples data from one of the signal processors to the transmit output port.

23. The coprocessor of claim 14, wherein the memory for storing control data includes crosstalk cancellation machine executable instructions for processing an input signal received at the receive input port into an output signal sent to the receive output port.

24. The coprocessor of claim 23, wherein the crosstalk cancellation instructions effect crosstalk cancellation using input data for a user signal and one of an other input data from an other user signal and processed data from the other user signal.

25. The coprocessor of claim 24, wherein the memory stores first control data for processing with the second input data and second control data for processing with the processed data.

26. A method of processing a received data signal subject to crosstalk signal degradation, the method comprising:
receiving a first signal on a first line, the first signal modulated on a first tone and a second tone;
receiving a second signal on a second line, the second signal modulated on the first tone and the second tone;
performing a transform and equalization on the first and second signals to generate i) data corresponding to the first tone of the first signal, ii) data corresponding to the second tone of the first signal, iii) data corresponding to the first tone of the second signal, and iv) data corresponding to the second tone of the second signal;
storing i) the data corresponding to the first tone of the first signal and ii) the data corresponding to the second tone of the first signal in a first receive buffer;
storing i) the data corresponding to the first tone of the second signal and ii) the data corresponding to the second tone of the second signal in a second receive buffer;
sending i) the data corresponding to the first tone of the first signal, ii) the data corresponding to the second tone of the first signal, iii) the data corresponding to the first tone of the second signal, and iv) the data corresponding to the second tone of the second signal to a coprocessor according to a predetermined sequence as specified by a tone table;

receiving from the coprocessor first and second result signals corresponding to the first and second signals, respectively;

storing the first and second result signals in the first and second receive buffers, respectively;

conditioning the first and second result signals; and sending the first and second result signals.

27. The method of claim 26, wherein receiving the first signal and receiving the second signal further comprise:

receiving the first signal at a first interface circuit; and receiving the second signal at a second interface circuit, wherein the tone table is common between the first interface circuit and the second interface circuit.

28. The method of claim 26, further comprising:

sharing the tone table with the coprocessor for use in receiving i) the data corresponding to the first tone of the first signal, ii) the data corresponding to the second tone of the first signal, iii) the data corresponding to the first tone of the second signal, and iv) the data corresponding to the second tone of the second signal according to the predetermined sequence.

29. The method of claim 26, further comprising:

building the tone table to specify that any combination of received signals that are transmitted using a like tone will be sent to the coprocessor at different times.

30. The method of claim 29, further comprising:

building the tone table to specify an idle transfer period when signals using the first tone require additional processing time at the coprocessor.

31. A method of processing signals at a coprocessor, comprising:

receiving a plurality of signals, each of the plurality of signals modulated on a corresponding one of a plurality of tones;

storing each of the plurality of signals in a respective buffer memory;

sending each of the plurality of signals stored in the respective buffer memory to one of a plurality of signal processors based on tone, so that a plurality of signals modulated on the same tone are sent to the same signal processor;

processing the plurality of signals at the plurality of signal processors;

receiving, from the plurality of signal processors, a processed result for each of the plurality of signals; and storing the processed result for each of the plurality of signals to the respective buffer memory.

32. The method of claim 31, wherein receiving the plurality of signals further comprises:

receiving a plurality of inbound signals and processing each with respective outbound data for use in near-end crosstalk cancellation.

33. The method of claim 31, wherein processing the plurality of signals further comprises:

loading each of the plurality of signal processors with coefficient data corresponding to processing a respective tone.

34. The method of claim 31, wherein sending each of the plurality of signals to one of the plurality of signal processors further comprises:

managing settings for an inbound switch matrix according to a tone table used by a source of the plurality of signals to select an order of the plurality of signals.

35. The method of claim 31, wherein receiving the processed result for each of the plurality of signals further comprises:

managing settings for an outbound switch matrix according to a tone table.

36. The method of claim 31, wherein receiving the plurality of signals comprises receiving each of the plurality of signals via a respective signal line of a plurality of signal lines, wherein each respective buffer memory corresponds to a respective one of the plurality of signal lines.

\* \* \* \* \*